US005562452A

United States Patent [19]

Atugi et al.

[11] Patent Number: 5,562,452

[45] Date of Patent: Oct. 8, 1996

[54] DRAWING TOY

[75] Inventors: Minoru Atugi; Takao Namiki, both of Tokyo, Japan

[73] Assignee: Tomy Company, Ltd., Tokyo, Japan

[21] Appl. No.: 330,806

[22] Filed: Oct. 28, 1994

[30] Foreign Application Priority Data

Nov. 2, 1993 [JP] Japan ............................ 5-063667 U

[51] Int. Cl.[6] ............................................ G09B 11/00

[52] U.S. Cl. ............................ 434/85; 33/18.1; 33/1 M

[58] Field of Search ............................ 434/85, 87, 88, 434/84, 81; 446/436; 33/18.1, 1 M, 1 K, 23.01, 23.08, 23.11, 27.12, 30.3

[56] References Cited

U.S. PATENT DOCUMENTS

| | | | |
|---|---|---|---|
| 3,638,319 | 2/1972 | Barlow et al. | 33/18.1 |
| 3,834,027 | 9/1974 | Amelon . | |
| 4,825,556 | 5/1989 | Goldfarb | 33/18.1 X |
| 5,321,891 | 6/1994 | Arad et al. | 33/18.1 |

FOREIGN PATENT DOCUMENTS

| | | |
|---|---|---|
| 201278 | 8/1923 | United Kingdom . |
| 953030 | 3/1964 | United Kingdom . |
| 1166494 | 10/1969 | United Kingdom . |

*Primary Examiner*—Gene Mancene
*Assistant Examiner*—Jeffrey A. Smith
*Attorney, Agent, or Firm*—Staas & Halsey

[57] ABSTRACT

The drawing toy of the present invention includes: a paper retainer, to retain a piece of paper for drawing; a writing tool holder, for use in drawing on the paper; a first cam, keeping the information for moving the writing tool holder in a first direction along said paper; a second cam, carrying the information for moving the writing tool holder along the paper and in a second direction, perpendicular with the first direction; a cam driver, to drive the first cam and the second cam; and a drawing mechanism coupled to the first cam and the second cam, which moves the writing tool holder in response to the movements of both cam's, whereby a drawing may be effected on the paper.

3 Claims, 10 Drawing Sheets

DRAWING TOY

FIELD OF THE INVENTION

The present invention relates to a drawing toy for producing a drawing based upon information stored upon a cam assembly.

DESCRIPTION OF THE RELATED ART

Conventional drawing toys provide for the copying of patterns of various shapes from patterns made of a plastic board which has been punch pressed to provide an outline of the shapes. To prepare a drawing with a conventional drawing toy the toy or pattern is placed upon a stationary sheet of drawing paper and a writing tool such as a pencil held in the hand is moved along the outline of the press punched pattern thereby copying the pattern to the drawing paper.

In conventional drawing toys, as described above, it is difficult for a small child to keep the pattern stationary on the drawing paper while moving the pencil along the outline of the pattern. Therefore it is very difficult for a child to accurately transfer the pattern to the paper. Further, the patterns are limited to those which can be drawn in a single stroke or to very simple pattern profiles.

SUMMARY OF THE INVENTION

The present invention has been devised to improve upon the limitations of conventional drawing toys and to provide a drawing toy capable of accurately drawing complicated drawing figures.

The present invention relates to a drawing toy which includes a paper retainer to keep a piece of paper in place for use in drawing, a writing tool holder which positions a writing tool for drawing on paper, a first cam which includes information for moving the writing tool holder in a first direction along the paper, and a second cam holding information for moving the writing tool holder along the paper in a second direction, perpendicular to the first direction. The drawing tool also includes a cam drive which drives the first and second cams and thereby the writing tool holder in order to make a drawing on the paper. The drawing tool may also include a third cam coupled to the cam drive which moves a paper holder up and down to allow many discontinuous lines to be drawn. Several cam means may be provided, each holding information for drawing a separate figure.

The invention will now be further described by way of example with reference to the accompanying drawings, in which:

DESCRIPTION OF THE PREFERRED EMBODIMENT

Figure 1:
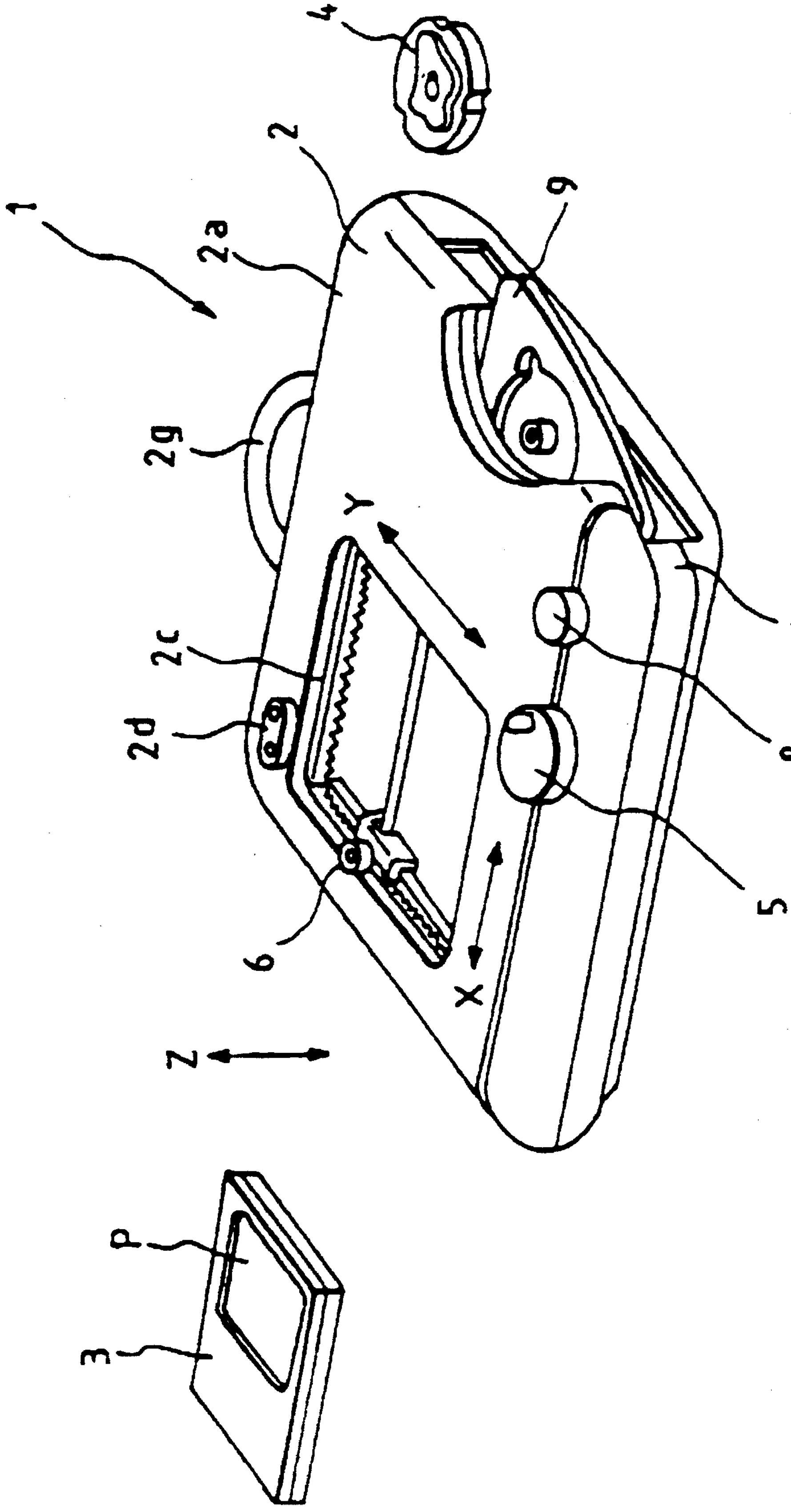
FIG. 1 is a perspective view of the present invention.

Referring to the drawings, the drawing toy 1 of the present invention, as seen in FIG. 1, features an external frame body 2 of drawing toy 1. The external frame of body 2 comprises upper frame 2*a*, lower frame 2*b*, body 2 is provided with window 2*c* through which the surface of paper P is exposed, handle 5 turns cam assembly 4, ejection button 8 engages and disengages cam assembly 4, and writing tool storage 2*d* in which a writing tool (omitted from figures) is held. Body 2 is further provided, respectively, with paper tray inserting opening 2*e* (see FIG. 3) at the left side of body 2 through which paper tray 3 is loaded and unloaded from the body. An opening for cam assembly removal 2*f* (see FIG. 3) is provided at the right side of body 2 from which cam tray 9 protrudes, and carrier handle 2*g* is formed at the top side of body 2.

In the present drawing toy, paper P is placed on paper tray 3 and cam assembly 4, which carries information for controlling the movement of the writing tool, and paper tray 3 are loaded into body 2. To load the drawing toy, paper P is first set on paper tray 3, paper tray 3 is then loaded into place from paper tray insert opening 2*e*. Cam tray 9 is then released from body 2 by pressing ejection button 8, and cam assembly 4 is placed on cam tray 9. The tray is then pressed into the body 2. The writing tool is then placed in the writing tool holder 6. By turning handle 5 clockwise, turning cam assembly 4 moves writing tool holder 6 in the axial directions marked by arrows X and Y in response to the lobes of cam assembly 4. At the same time, paper tray 3 is moved up and down in the axial direction marked by arrow Z such that the pen point is brought into and out of contact with the paper, with the result that a figure conforming to the configuration of cam assembly 4 is drawn.

Figure 2:
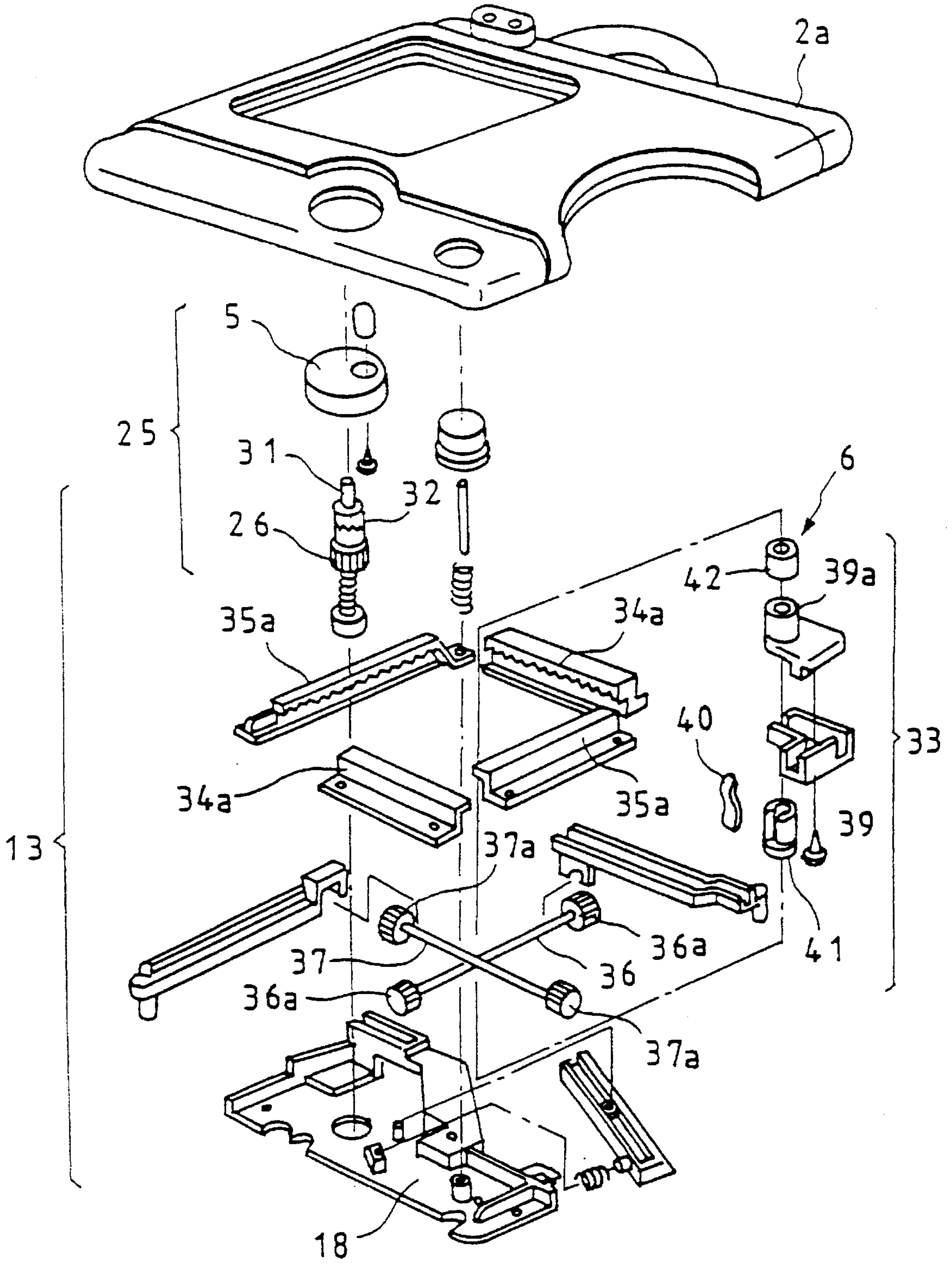
FIG. 2 is an exploded view showing the upper structure of the present invention.
Figure 3:
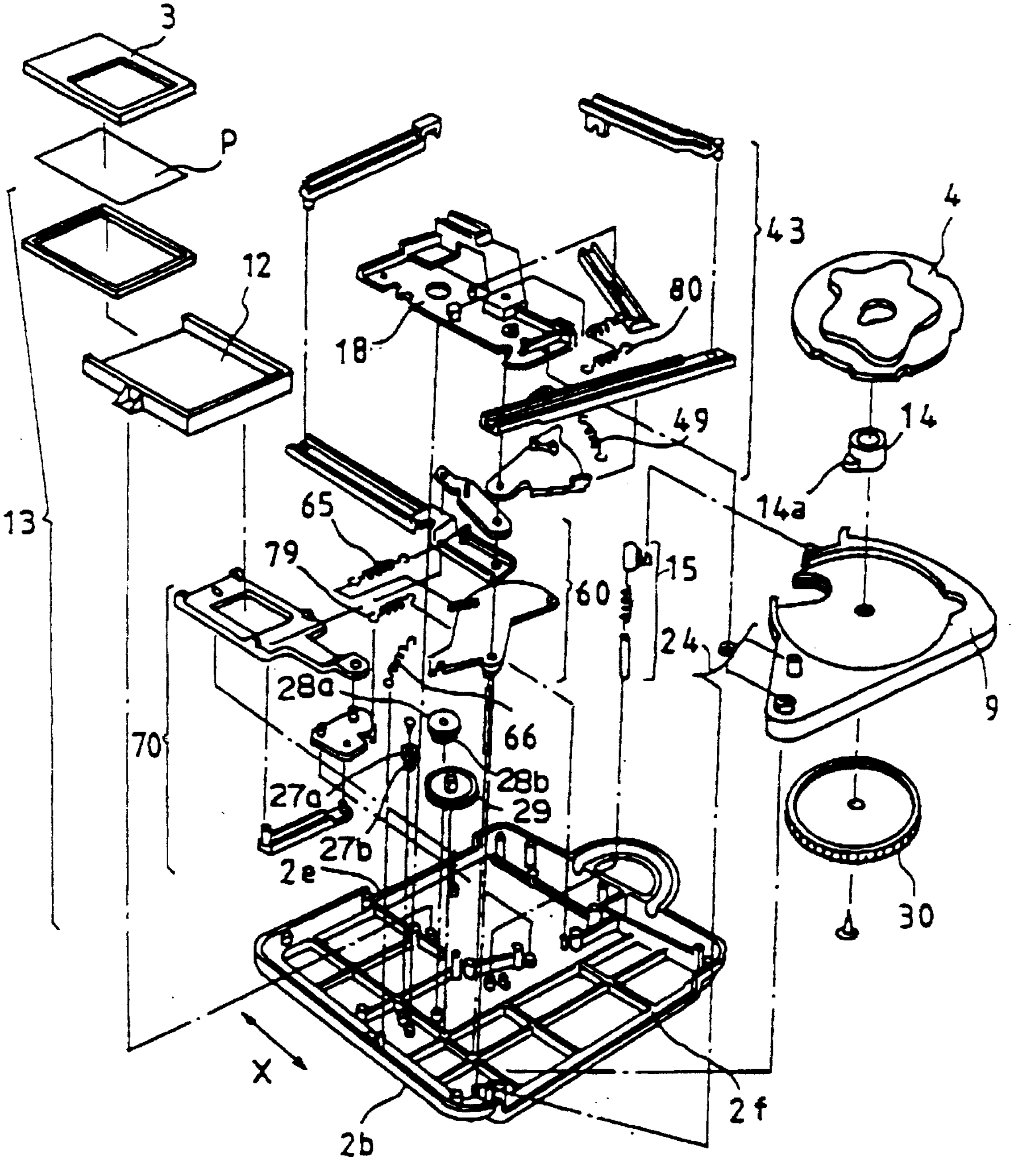
FIG. 3 is an exploded view showing the lower structure of the present invention.

The details of drawing toy 1 of the present invention will now be described, referring to FIGS. 2 through 15. FIG. 2 is a perspective view of the upper structure of drawing toy 1. FIG. 3 is a perspective view of the lower structure of drawing toy 1. For convenience, some parts are presented in both FIG. 2 and FIG. 3.

Figure 4:
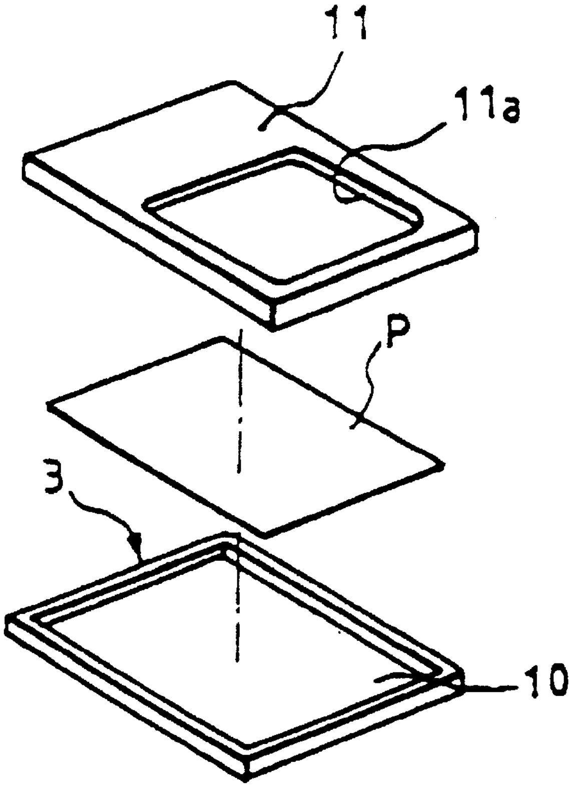
FIG. 4 is an exploded view showing a paper tray of the present invention.

Paper tray 3 comprises: tray body 10 and tray cover 11, shown in rectangular shape in FIG. 4. The paper tray is structured such that when tray cover 11 engages tray body 10, after paper P is placed on tray body 10, paper P is firmly retained therebetween. Tray cover 11 has window 11*a* formed therein to expose a part of the paper surface. When paper tray 3 is inserted into body 2 through paper tray inserting opening 2*e*, the tray is received on paper tray support member 12.

Figure 5:
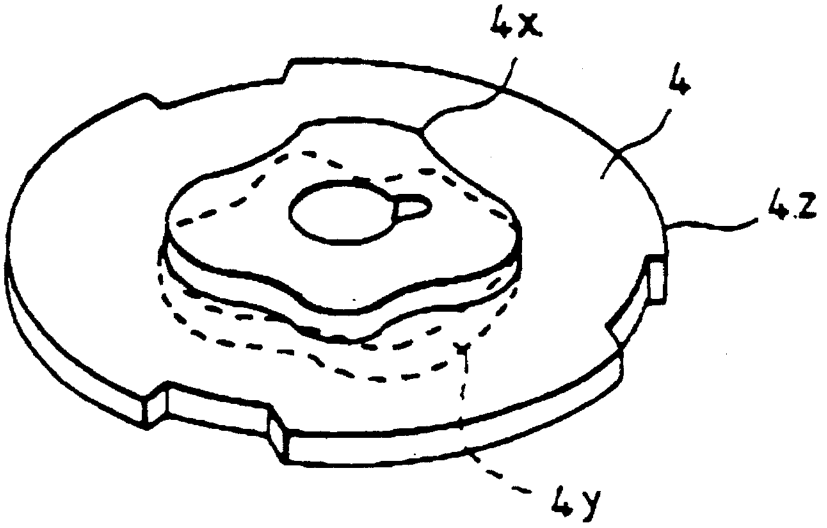
FIG. 5 is a perspective view of a cam assembly of the present invention.

As shown in FIG. 5, cam assembly 4 is a triplex cam structure. Cam assembly 4 comprises a first cam 4*x*, a second cam 4*y* and a third cam 4*z* which are stacked. Of these cams, cam 4*x* carries in its profile the information for moving writing tool holder 6 in the X axial direction; cam 4*y* has in its profile the information for moving writing tool holder 6 in the Y axial direction; and cam 4*z* has in its profile the information for moving paper tray 3 in the Z axial direction. In other words, cam assembly 4 keeps the information of drawing given figures, etc. in its triplex cam profiles. Preformed cam assembly 4 can be set on cam tray 9. Cam tray 9 is capable of being ejected from body 2 to allow the cam assembly to be changed.

Figure 6:
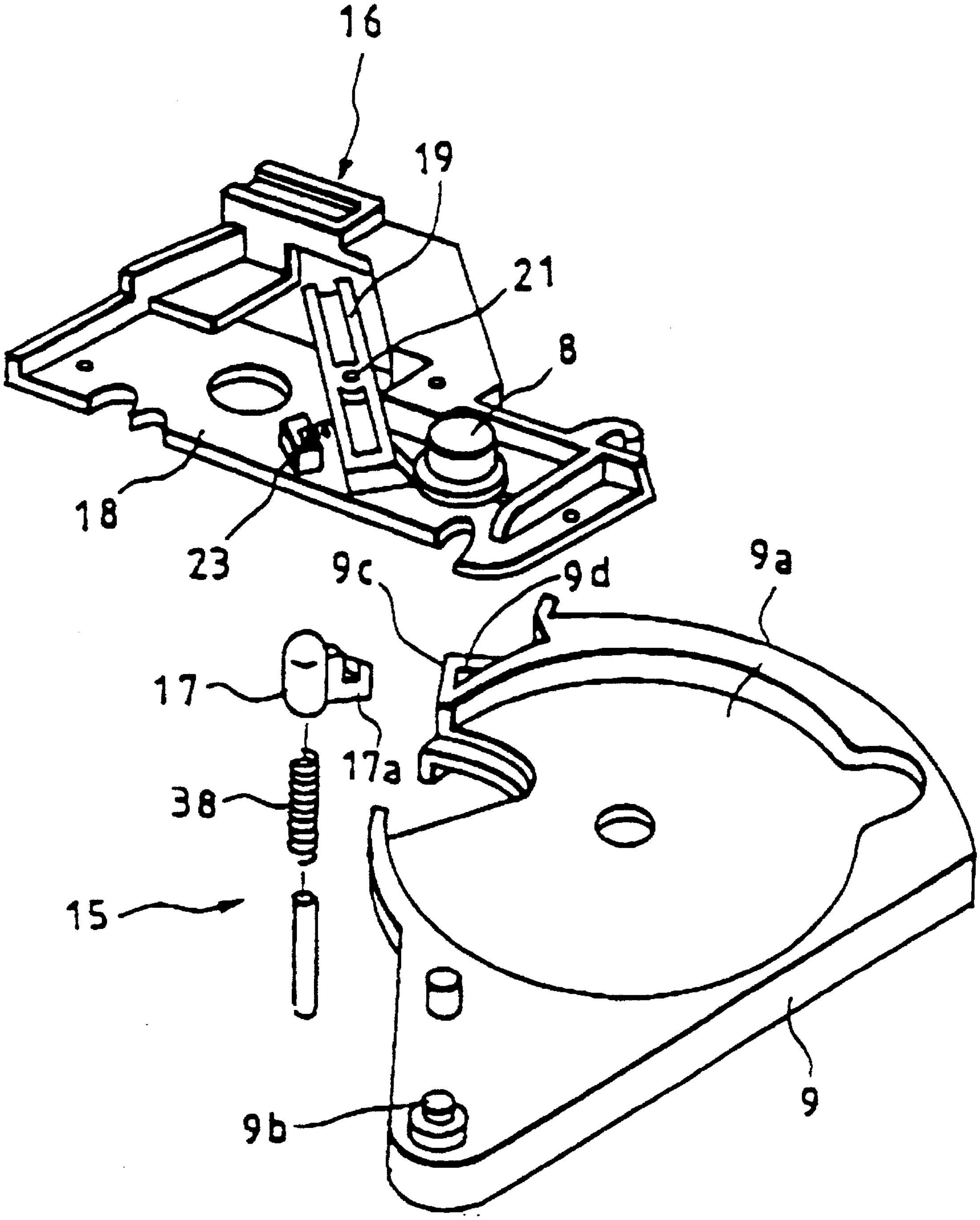
FIG. 6 is a perspective view showing a cam tray and an ejection mechanism of the present invention.
Figure 7:
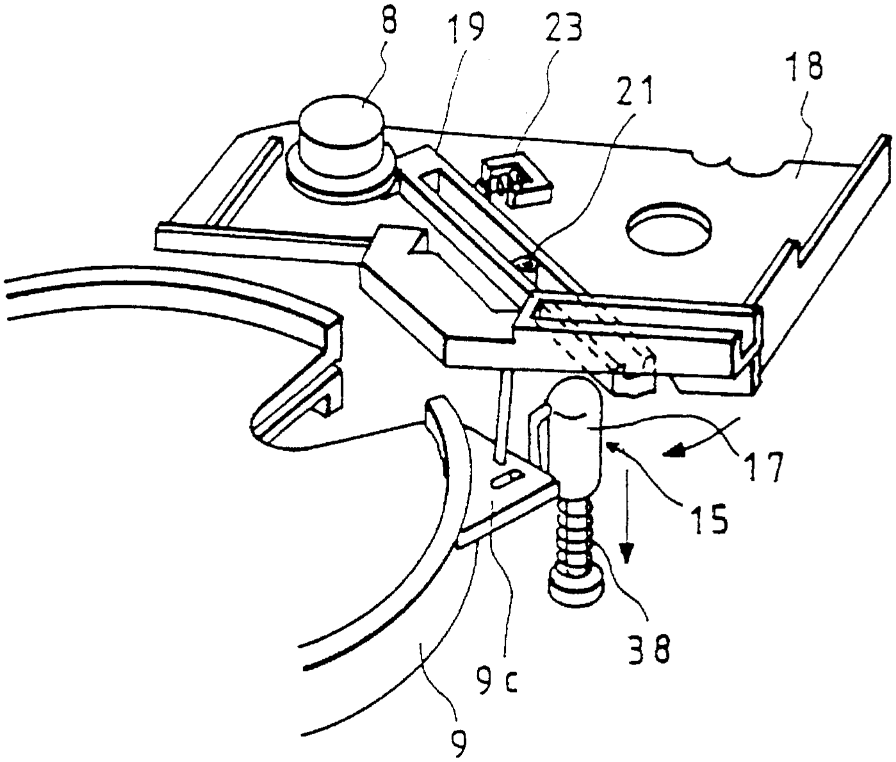
FIG. 7 is a perspective view showing a cam tray retaining mechanism and a cam tray ejection mechanism of the present invention.

Cam tray 9 is mounted to body 2 to allow the cam tray 9 to swing horizontally around shaft 9*b*, as shown in FIG. 6. Cam tray 9 is provided with a recess 9*a* in which cam assembly 4 is seated, and a part of recess 9*a* is cut out. At this cut-out part, cam assembly 4 engages with drawing mechanism 13 which will be described later. As shown in FIG. 3, cam assembly 4 is mounted to cam tray 9 by fitting cam assembly 4 on shaft member 14 provided with key 14*a*.

Referring to FIGS. 6 through 9, cam tray retaining mechanism 15 and cam tray ejection mechanism 16 will now be described. Cam tray retaining mechanism 15 comprises: claw hole 9*d*, provided in projection piece 9*c* at one lateral side of cam tray 9; and retaining rod 17, arranged close to cam tray 9 and forced upward by spring 38. The retaining rod 17 has claw 17*a* formed which can be engaged with claw hole 9*d*. The top surface of claw 17*a* slopes down toward the claw hole. When cam tray 9 is pushed into body 2, this sloped surface contacts the lower surface of the projection piece 9*c*, forcing retaining rod 17 down against the upward force of spring 38. Due to the sloped surface, claw hole 9*d* and claw 17*a* are brought into engagement. The top surface of retaining rod 17 presses on the eject mechanism plate 18 so that retaining rod 17 does not come off when cam tray 9 is ejected from body 2.

Figure 8:
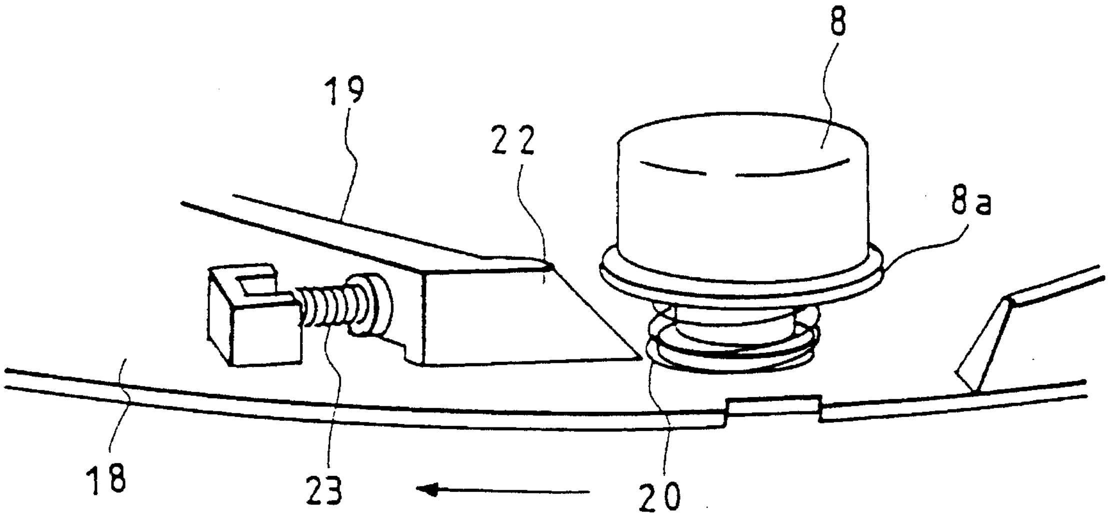
FIG. 8 is a perspective view showing a part of the cam tray ejection mechanism of the present invention.
Figure 9:
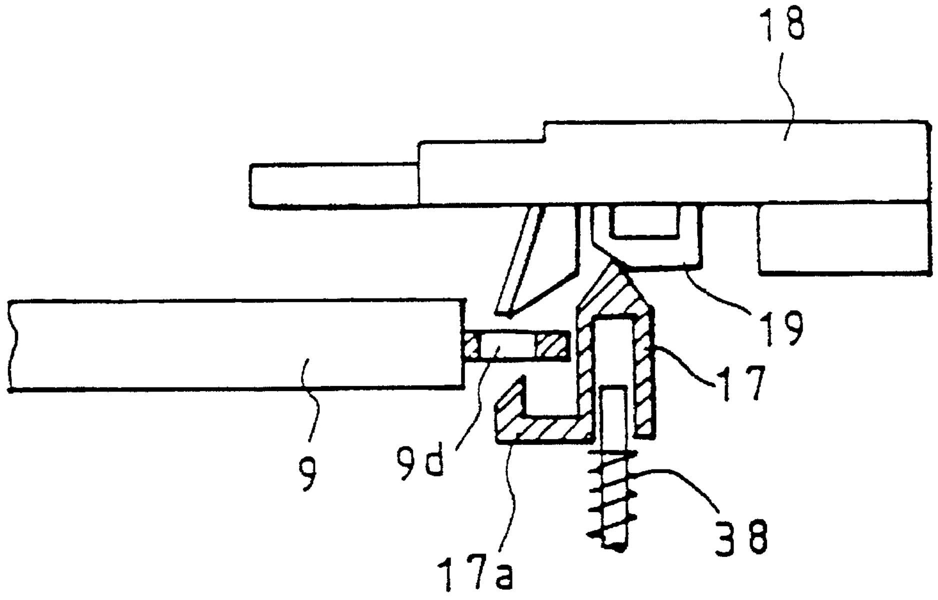
FIG. 9 is a diagram illustrating how the cam tray retaining mechanism and the cam tray ejection mechanism function.

Cam tray ejection mechanism 16 comprises: ejection button 8; swing plate 19, which forces the retaining rod 17 down when ejection button 8 is pushed; and twisted coil spring 24 (FIG. 3) which forces cam tray 9 outward to protrude from body 2. Ejection button 8 is provided with flange 8*a* (FIG. 8) and is forced upward by spring 20. Swing plate 19 is mounted to allow it to swing about shaft 21 and the fore lateral end of the swing plate 19 is forced toward the ejection button 8. The fore lateral end of swing plate 19 is provided with projection button 22 protruding toward ejection button 8 (FIG. 8). The upper surface of this projection 22 has a downward slope toward the ejection button 8. The sloped surface of the projection is held at a location under flange 8*a* of ejection button 8 due to the action of the spring 23 while the ejection button 8 is not pressed. Pressing ejection button 8 brings flange 8*a* into contact with the sloped surface of projection 22, whereby swing plate 19 is turned in a direction (clockwise) against the force of spring 23. As shown in FIG. 9, a part of the lower face of the recessed end of swing plate 19 is also inclined, the face contacts the sloped portion of retaining rod 17, and when swing plate 19 rotates counterclockwise when the ejection button 8 is pressed, this inclined part of said lower face depresses the head of retaining rod 17, thereby forcing retaining rod 17 down, against the force of spring 38. Further, twisted coil spring 24 biases cam tray 9 so that the cam tray protrudes from the body 2 when the claw disengages the claw hole. Therefore, when the engagement between claw hole 9*d* of cam tray 9 and claw 17*a* of retaining rod 17 is released by depressing the ejection button 8, cam tray 9 automatically protrudes from body 2 due to the action of the twisted coil spring 24.

Figure 10:
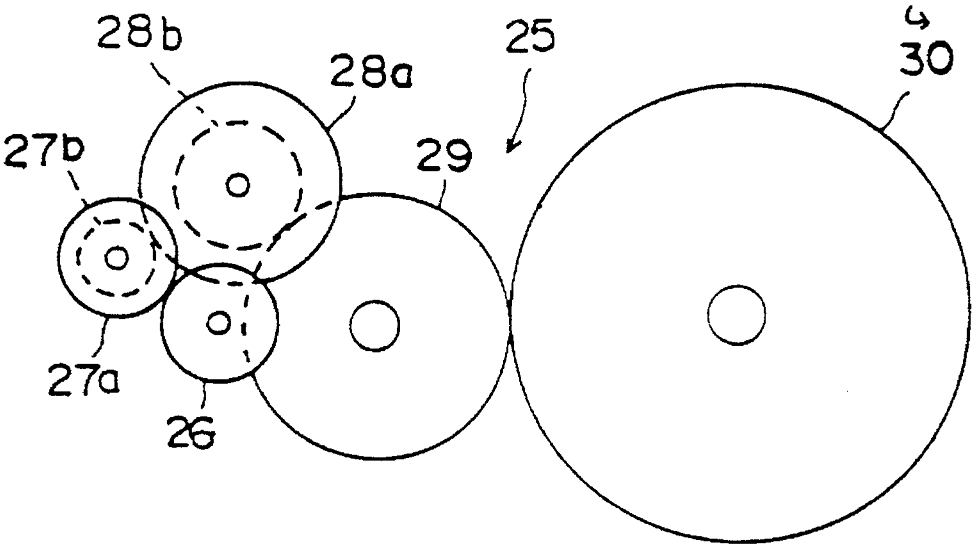
FIG. 10 is an exploded view showing the engagement among the gears in a cam drive mechanism of the present invention.
Figure 11:
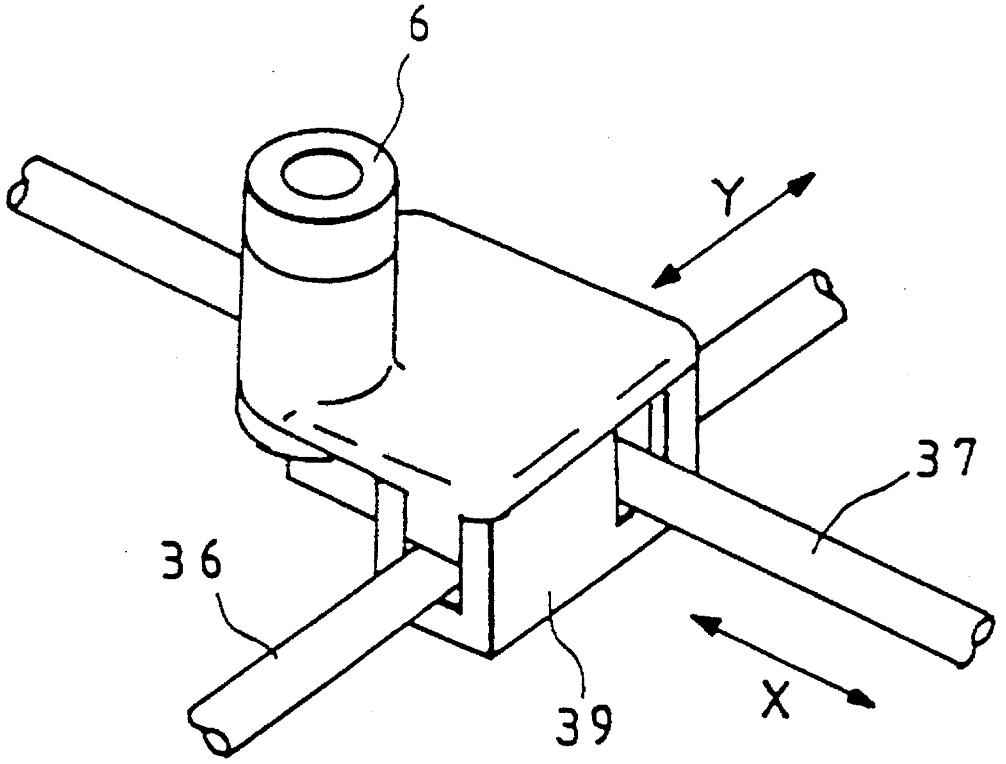
FIG. 11 is a perspective view showing a writing tool holder and a guide mechanism of the present invention.

With reference to FIGS. 2, 3 and 10, cam drive mechanism 25 is now described. Cam drive mechanism 25 comprises: handle 5; gear 26, integrally working with the handle 5; gears 27*a*, 27*b*, 28*a*, 28*b*, 29 and 30, respectively, serving to transmit the turning force from gear 26 to the cam assembly 4; and shaft member 14 which is attached to gear 30. Cam drive mechanism 25 is formed such that manipulating handle 5 transmits turning force to the cam assembly 4 via gears 27*a*, 27*b*, 28*a*, 28*b*, 29 and 30 and shaft member 14. Shaft 31 of the handle 5 is provided with a clutch 32. Clutch 32 is a face plate type, whereby turning handle 5 in the reverse direction results in deactivating the clutch 5, thereby interrupting the transmission of the turning force from handle 5 to gear 26.

The parts and mechanisms other than those referred to above and which are provided in body 2 will now be described.

Figure 12:
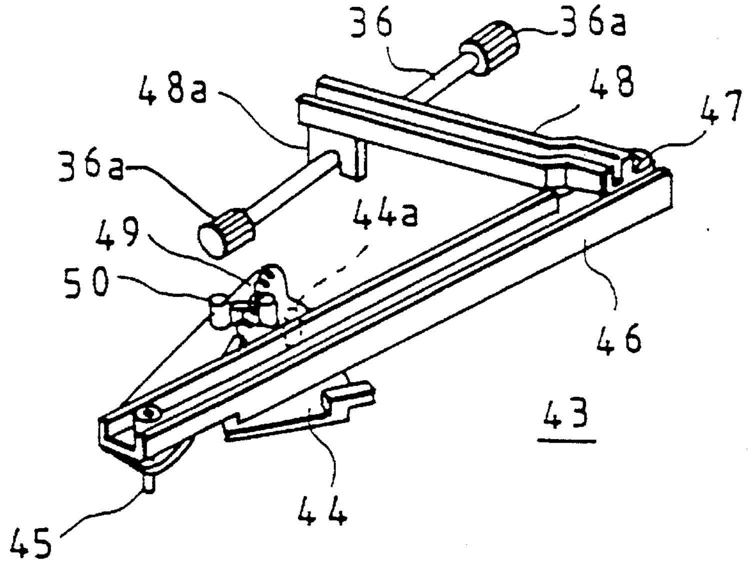
FIG. 12 is a perspective view of an X-direction movement mechanism of the present invention.

Within body 2, there is provided: writing tool holder 6 (FIG. 11); guide mechanism 33 (FIG. 2), carrying said writing tool holder; and X axial movement mechanism 43 (FIG. 12); Y axial movement mechanism 60 (FIG. 13); and Z axial movement mechanism 70 (FIG. 14) which constitute drawing mechanism 13 with guide mechanism 33.

Guide mechanism 33 will be described first. As shown in FIG. 2, guide mechanism 33 comprises a rack and pinion mechanism. Guide mechanism 33 comprises: two sets of racks 34*a* and 35*a* which are provided under a window frame of body 2; pinion shaft 36, having at both ends pinion gears 36*a* which engage racks 34*a*, respectively; pinion shaft 37, having at both ends pinion gears 37*a* which engage racks 35*a*, respectively; and slider 39 having pinion shafts 36, 37 penetrated therethrough and capable of moving along said pinion shafts 36 and 37 in the X and Y axial directions. The writing tool holder 6 is mounted to the slider 39.

Writing tool holder 6 is mounted with leaf spring 40 to externally press-hold the writing tool in position. The writing tool holder 6 comprises: pipe 41, which can be fitted in sleeve 39*a* of slider 39; and stop ring 42, mounted and fitted on top of sleeve 39*a*.

FIG. 12 describes the X axis movement mechanism. The X axial movement mechanism 43 serves to move the writing tool holder 6 in the X axial direction in response to the cam profile of running cam 4*x*. The X axial movement mechanism comprises: link 44, swingably centering around shaft 45 fitted with pin 44*a* which comes into contact with cam 4*x*; link 46, swingably centered about shaft 45, follows the swing of link 44, and link 48 which can also swing, centered about shaft 47 provided at the upper part of link 46, as shown in FIG. 12. Links 44 and 46 are coupled together via spring 49. Links 44, 46 turn counterclockwise integral with one another due to the action by spring 49. Projection 50 is provided on the top face of link 44 which is held in contact with link 46 due to the action by spring 49. Turning link 44 clockwise turns link 46 clockwise integrally due to the action by projection 50. Further, link 44 is hooked by spring 80 (FIG. 3), and pin 44*a* is maintained in contact with cam 4*x* due to the action of spring 80. A lower side of the free end of link 48 there is formed a projection piece 48*a* including a recess which engages pinion shaft 36. By following the cam profile of the turning cam 4$x$, a link mechanism with links 46 and 48 moves pinion shaft 36 in the X axial direction. The link mechanism allows the drawing toy to withstand external force which is absorbed by link 44. An example of an external force would be when handle 5 is turned while a child presses down the writing tool set on writing tool holder 6.

Figure 13:
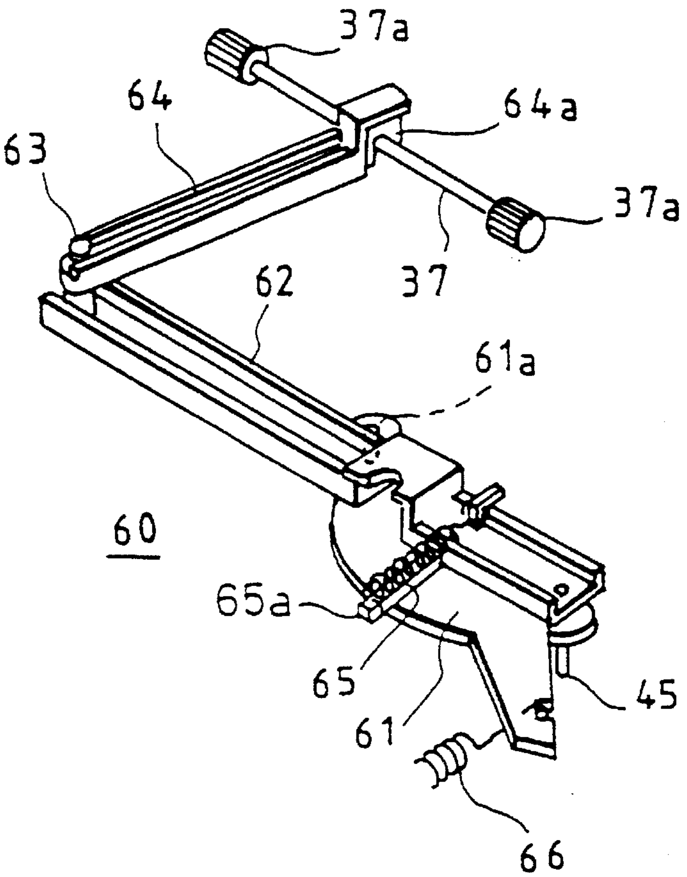
FIG. 13 is a perspective view showing a Y-direction movement mechanism of the present invention.

FIG. 13 describes the Y-axis movement mechanism. The Y-axis movement mechanism 60 serves to move the writing tool holder 6 in the Y axial direction, following the cam profile of running cam 4$y$. The Y-axial movement mechanism comprises: link 61, swingably centered about shaft 45, following the swing of link 61; and link 64 which can also swing, centered about shaft 63 on link 62. Links 61 and 62 are coupled together via spring 65, and therefore, links 61 and 62 turn clockwise integral with one other by the action of spring 65. Further, spring hook 65$a$ is provided on link 61 with which link 62 is kept in contact by the action of spring 65. Link 61 is hooked by spring 66 (FIG. 3), and thereby pin 61$a$ is held in contact with cam 4$y$. At the lower side of the free end of link 64, there is formed a projection piece 64$a$ having a recess in which pinion shaft 37 is engaged. Link 61 follows the cam profile of running cam 4$y$, whereby links 62 and 64 operated to move pinion shaft 37 in the Y axial direction. Link 61 also serves as a safety mechanism.

Figure 14:
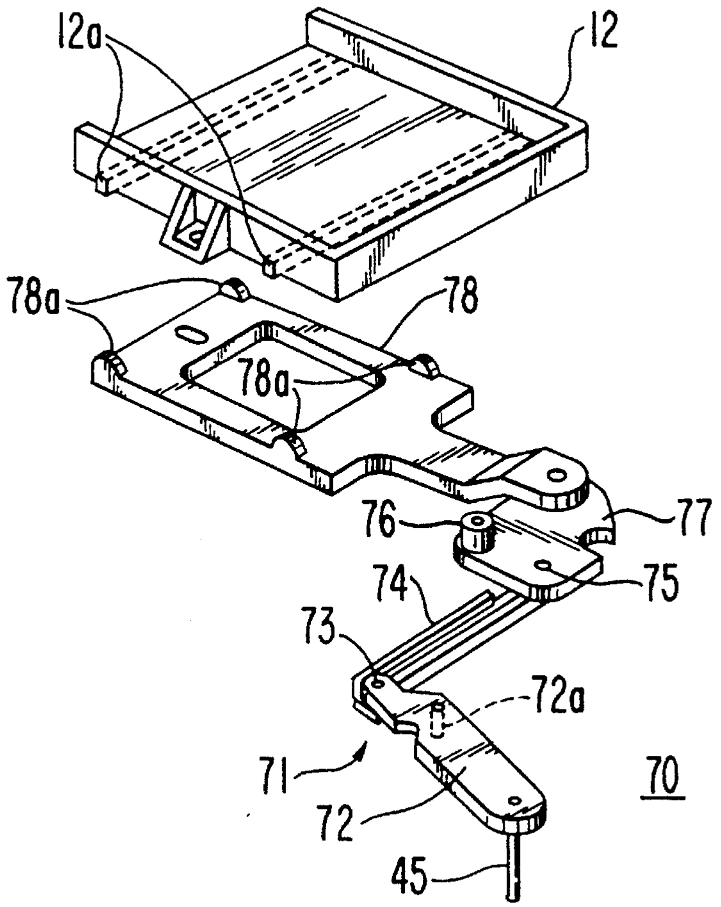
FIG. 14 is a perspective view showing a Z-direction movement mechanism of the present invention.
Figure 15:
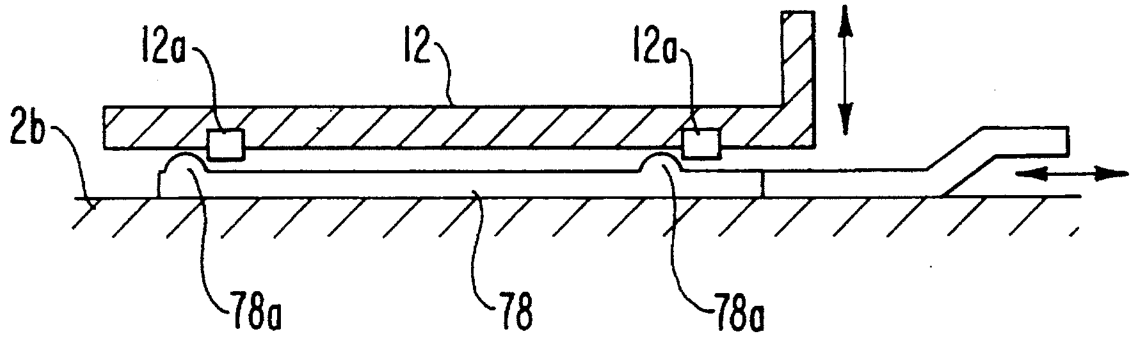
FIG. 15 is a front view showing the Z-direction movement mechanism of the drawing toy of the present invention.

FIG. 14 describes the Z-axis movement mechanism. The Z-axis movement mechanism 70 serves to move paper holder 12 in the Z axial direction in response to the cam profile of running cam 4$z$. The Z-axis movement mechanism comprises a 4-node run interlock mechanism 71, slider 78 coupled thereto, and paper tray support member 12 which is moved up and down by slider 78. The 4-node run interlock mechanism 71 comprises: lower frame 2$b$ of body 2; link 72, swingably centered about shaft 45 which is fitted with pin 72$a$ contacting cam 4$z$; link 74, swingably centered about shaft 73 on link 72; shaft 75, provided on link 74; and link 77 swingably centered about shaft 76 on lower frame 2$b$. Slider 78 is engaged with link 77 at a part other than the shaft 75 on link 74. Slider 78 reciprocates under the paper tray support member 12. As shown in FIG. 15, there are tongue-like projections 78$a$ on the upper side of slider 78. Two convexed strips 12$a$ are provided at the lower side of the paper tray support member 12. When tongue-like projections 78$a$ of the slider 78 meet the two convexed strips 12$a$ of paper tray support member 12, paper tray support member 12 moves up, thereupon the pen point is brought into contact with the paper P. Link 72 is hooked by spring 79 (FIG. 3), thereby pin 72$a$ is kept in contact with cam 4$z$.

The overall performance of drawing toy 1 will now be described. Turning handle 5 clockwise actuates the cam drive mechanism and turns cam assembly 4. When cam assembly 4 turns, cams 4$x$, 4$y$ and 4$z$ actuate X-axis movement mechanism 43, Y-axis movement mechanism 60 and Z-axis movement mechanism 70, respectively. Guide mechanism 33 and paper tray support member 12 are likewise driven. X-axis movement mechanism 43 and Y-axis movement mechanism 60 moves writing tool holder 60 in the X and Y axial directions. Z-axis movement mechanism 70 moves paper tray support member 12 up and down. While the paper tray support member 12 is in the raised position, writing tool holder 6 moves the pen on the paper in the X and Y axial directions, drawing a figure corresponding to the combination of the respective cam profiles of cam assembly 4. Separate cam assemblies 4 corresponding to individual figures are prepared. The figure a young user wants can be drawn by selecting one cam assembly 4 which corresponds to his or her desired figure.

In the present invention, manipulation of handle 5 drives the writing tool and mechanisms according to the figure information on cam assembly 4. The cam assemblies contain information not only for a single stroke drawing but also for a complex pattern made up of various discontinuous lines.

In the embodiment described, cam drive mechanism 24 is formed such that cam assembly 4 is driven by handle 5. However, cam drive mechanism 24 may be driven by a motor.

Further in the present embodiment, the contact of the pen point of the writing tool to paper P and the release of the pen point from paper P, is controlled by moving paper tray 12 vertically. But writing tool holder 6 may be capable of being moved up and down in reference to paper P.

Writing tool holder 6 is not limited to the present embodiment and may be embodied by a writing tool held firmly in place by, for example, a clip.

The paper referred to in the present embodiment includes a wide variety of papers such as tracing paper, vinyl paper, etc.

What is claimed is:

1. A drawing toy comprising:

a frame;

a paper holder for holding paper releasably attached to the frame;

a cam mechanism having first, second and third cams;

a cam holder for releasably supporting the cam mechanism, the cam holder being movable from an inserted position within the frame and an extracted position outside of the frame;

a manipulation member;

a cam holder ejection mechanism for locking the cam holder at the inserted position when the cam holder is manually moved to the inserted position, and for biasing the cam holder to the extracted position when the manipulation member is manually operated;

a writing tool; and a writing tool driving mechanism for moving the writing tool in the plane of the paper so that movement of the writing tool in a first direction within the plane of the paper corresponds to the shape of the first cam and movement of the writing tool in a second direction, perpendicular to the first direction, within the plane of the paper corresponds to the shape of the second cam, and for separating and engaging the writing tool and the paper based on the shape of the third cam.

2. A drawing toy as claimed in claim 1, wherein the writing tool driving mechanism includes a handle operatively attached to the cam mechanism for rotating the cam mechanism when the handle is turned.

3. A drawing toy as claimed in claim 1, wherein the writing tool driving mechanism separates and engages the writing tool and the paper by selectively moving the paper holder towards and away from the writing tool.

* * * * *